United States Patent [19]

Pierce et al.

[11] 3,890,968
[45] June 24, 1975

[54] FLUID FLOW CONTROL MEANS

[75] Inventors: Oscar L. Pierce; Arthur H. Hutchison; Olin B. King; Lonnie S. McMillian, all of Huntsville, Ala.

[73] Assignee: SCI Systems, Inc., Huntsville, Ala.

[22] Filed: June 25, 1971

[21] Appl. No.: 156,854

[52] U.S. Cl. ..... 128/214 E; 73/194 E; 128/DIG. 13; 137/486; 340/239 R
[51] Int. Cl. .......................................... A61m 5/00
[58] Field of Search ............ 128/213, 214 E, 214 F, 128/214.2, DIG. 12, DIG. 13; 222/14, 21, 59; 137/486, 875; 251/65, 141; 340/239 R; 73/194 E

[56] References Cited
UNITED STATES PATENTS

| | | | |
|---|---|---|---|
| 2,254,833 | 9/1941 | Ashkenaz | 128/213 |
| 2,294,421 | 9/1942 | Ray | 251/141 |
| 3,390,577 | 7/1968 | Phelps et al. | 73/194 E |
| 3,456,648 | 7/1969 | Lee et al. | 138/214 E |
| 3,500,366 | 3/1970 | Chesney et al. | 340/222 |
| 3,545,271 | 12/1970 | Amir et al. | 73/194 E |
| 3,601,124 | 8/1971 | Petree | 128/214 E |
| 3,623,052 | 11/1971 | Spiller | 340/239 R |
| 3,631,437 | 12/1971 | Campbell et al. | 340/239 R |
| 3,655,095 | 4/1972 | Kienitz | 222/59 |
| 3,790,042 | 2/1974 | McCormick et al. | 222/52 |
| 3,800,794 | 4/1974 | Georgi | 128/214 E |

FOREIGN PATENTS OR APPLICATIONS

| 30,234 | 7/1964 | Germany | 128/DIG. 13 |

*Primary Examiner*—Dalton A. Truluck
*Attorney, Agent, or Firm*—Curtis, Morris and Safford, P.C.; Neff, Gregor N., Esq.

[57] ABSTRACT

The flow controller repeatedly opens and closes a magnetic check valve for periods of time which determine the flow rate through the valve. The magnetic valve preferably has a movable valve closure member with an elongated stem which extends parallel to the direction of flow of fluid through the check valve. The stem is made of magnetic material. An electro-magnet is placed at the side of the valve, outside of the valve housing. The electro-magnetic field pulls the valve stem laterally to tip the valve member and open the valve. When the magnet is de-energized, the valve member moves back to its seat. The controller is used to control the flow of parenteral fluids into the veins of a human patient. The parenteral fluid controller has a drip chamber for collecting drops of fluid falling from a reservoir. The magnetic check valve is located in the conduit between the drip chamber and the patient's vein. A drop detector is provided for producing a signal each time a drop is formed. The latter signal controls the opening and closing of the valve and thus controls the flow of the parenteral fluid. Safety features are provided whereby the valve closes automatically if a drop has not been detected for a predetermined length of time. Therefore, abnormalities in the operation of the system will not cause excessive flow of Fluid or infusion of air into the patient's veins. An attendant will be warned of such a condition, or if the flow rate is too low or too high, or if the fluid level in the reservoir is low.

16 Claims, 10 Drawing Figures

INVENTORS:
OSCAR L. PIERCE
ARTHUR H. HUTCHISON
OLIN B. KING
LONNIE S. McMILLIAM

BY

Curtis, Morris & Safford

ATTORNEYS

PATENTED JUN 24 1975

SHEET 3

3,890,968

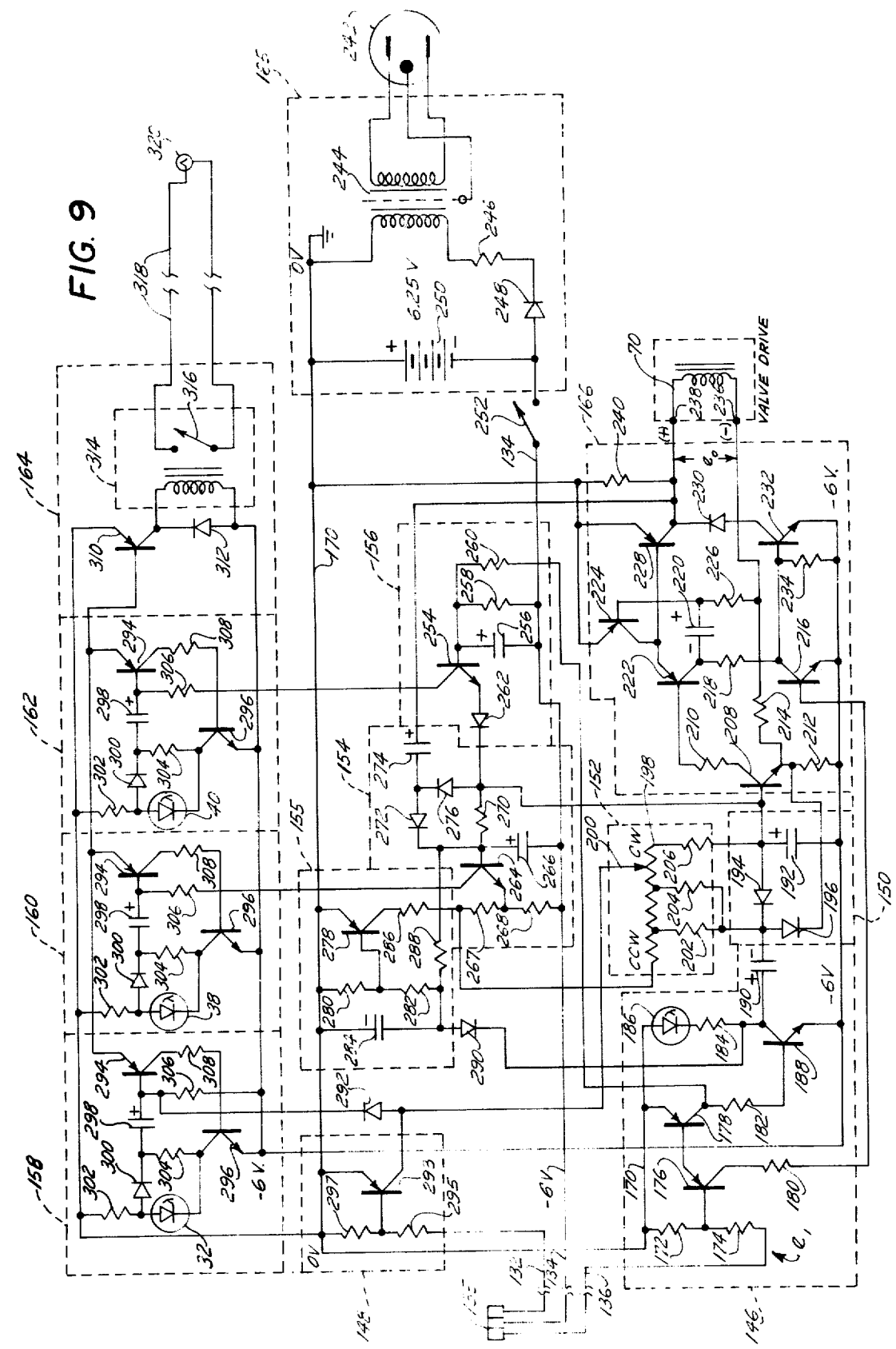

FLUID FLOW CONTROL MEANS

This invention relates to fluid flow controllers and to magnetic check valves for use in such controllers. More particularly, this invention relates to devices for controlling the flow of parenteral fluids to the veins of human patients.

The usual methods of administration of parenteral fluids such as blood, saline solutions etc. to hospital patients is very time-consuming. Usually, the fluid flow rate is controlled by a nurse who counts the drops falling from the fluid dispensing bottle within a given length of time, and thus measures the flow rate. If and when the nurse notices that the bottle is empty, or that something is blocking the flow, she corrects the situation. Not only is this process time-consuming, but also it is somewhat dangerous to the patient in many hospitals because the nurse or other attendant usually cannot afford the time to continuously watch the system to make sure that blockages in the flow do not occur, or that the bottle does not run dry.

A variety of automatic flow controllers for parenteral fluids have been proposed in the past. Many such devices control the flow by varying the setting of a clamp which physically pinches the flexible tube leading to the patient's vein. Other controllers knead the tube to pump the fluid to the patient. This is undesirable because it often results in permanent deformation of the tubing so that the controller eventually loses control over the flow rate.

Other controllers have been proposed in which the flow rate is controlled by means other than variable clamping. However, some of those prior controllers require the formation of access holes in the administration tube, thus making it easier for the fluid to become contaminated. Other devices which do not have the latter draw-back often require excessive amounts of electrical power and/or complicated equipment for proper operation, thus making them unreliable, bulky and overly expensive.

A serious problem with some prior controllers is that they permit either an infusion of air into the patient's veins, or an overdose of the fluid to be delivered to the patient. Sometimes, both conditions are permitted. Such equipment is quite unsafe.

Another problem often found in the administration of parenteral fluids is that blood clots tend to form in the needle feeding fluids into the patient's veins. This can cause a serious disruption of the administration of the fluid.

Various prior art devices having one or more of the deficiencies described above, and/or which may relate to this disclosure, as described in U.S. Pat. Nos. 2,254,833; 2,576,168; 2,925,814; 2,962,593; 3,014,481; 3,105,511; 3,163,176 and 3,348,543.

In accordance with the foregoing, it is an object of the present invention to provide a relatively simple, accurate and inexpensive flow control system which substantially avoids the problems described above. It is a specific object to provide a fluid control valve which can be operated effectively without providing contamination access routes into the fluid flowing through the valve, but which requires a minimum of operating power, and provides a high degree of safety. It is still another object of the invention to provide such a controller for administering parenteral fluids automatically at a pre-determined rate, with a minimum of operator attendance, but without air infusion or overdosage to the patient. It is a further object to provide such a system with automatic signaling means for warning an attendant that personal attention is necessary, thus further enhancing safety to the patient. It is a further object to provide such a system which is reliable, compact and light-weight.

In accordance with the present invention the foregoing objects are met, in part, by the provision of a flow controller having a unique magnetic valve for controlling the fluid flow. The valve has a seat and a movable valve member to rest against the seat. The valve member has at least a portion which is made of magnetic material. Means are provided for creating a magnetic force on the valve member for moving it sideways to unseat it and thus open the valve. In the preferred embodiment of the invention, the valve member has an elongated stem extending in the direction of fluid flow, and an electro-magnet is placed outside of the conduit to move the stem towards the side-wall of the conduit so as to tip the valve member on its seat. Flow of the fluid is controlled by repeatedly energizing the electro-magnet for varying time periods, the flow rate being detrmined by those time periods. This system is used in the control of the flow of parenteral fluids by the provision of a drop detector, and control means for making the time rate of actuation of the valve a function of the time rate of formation of the drops of fluid. Preferably, safety features are provided whereby the flow control valve automatically closes when there is a malfunction or long-term abnormality in the operation of the system so that air infusion or overdosage will not occur.

The foregoing and other objects and advantages of the invention will be described in or apparent from the following description and drawings. In the drawings.

Figures 1, 7:
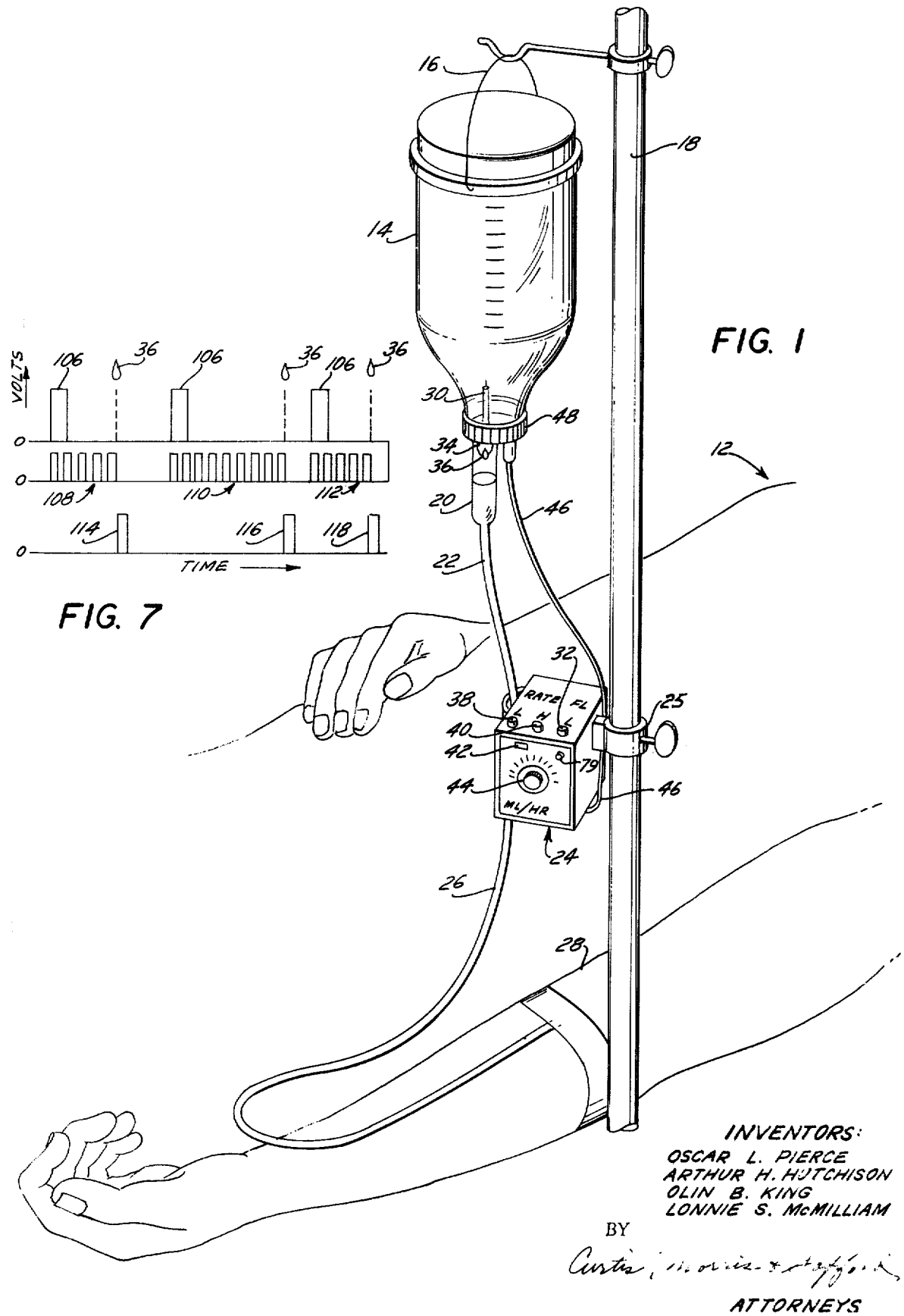
FIG. 1 is a perspective view showing a parenteral fluid controller system constructed in accordance with the present invention.
Figure 2:
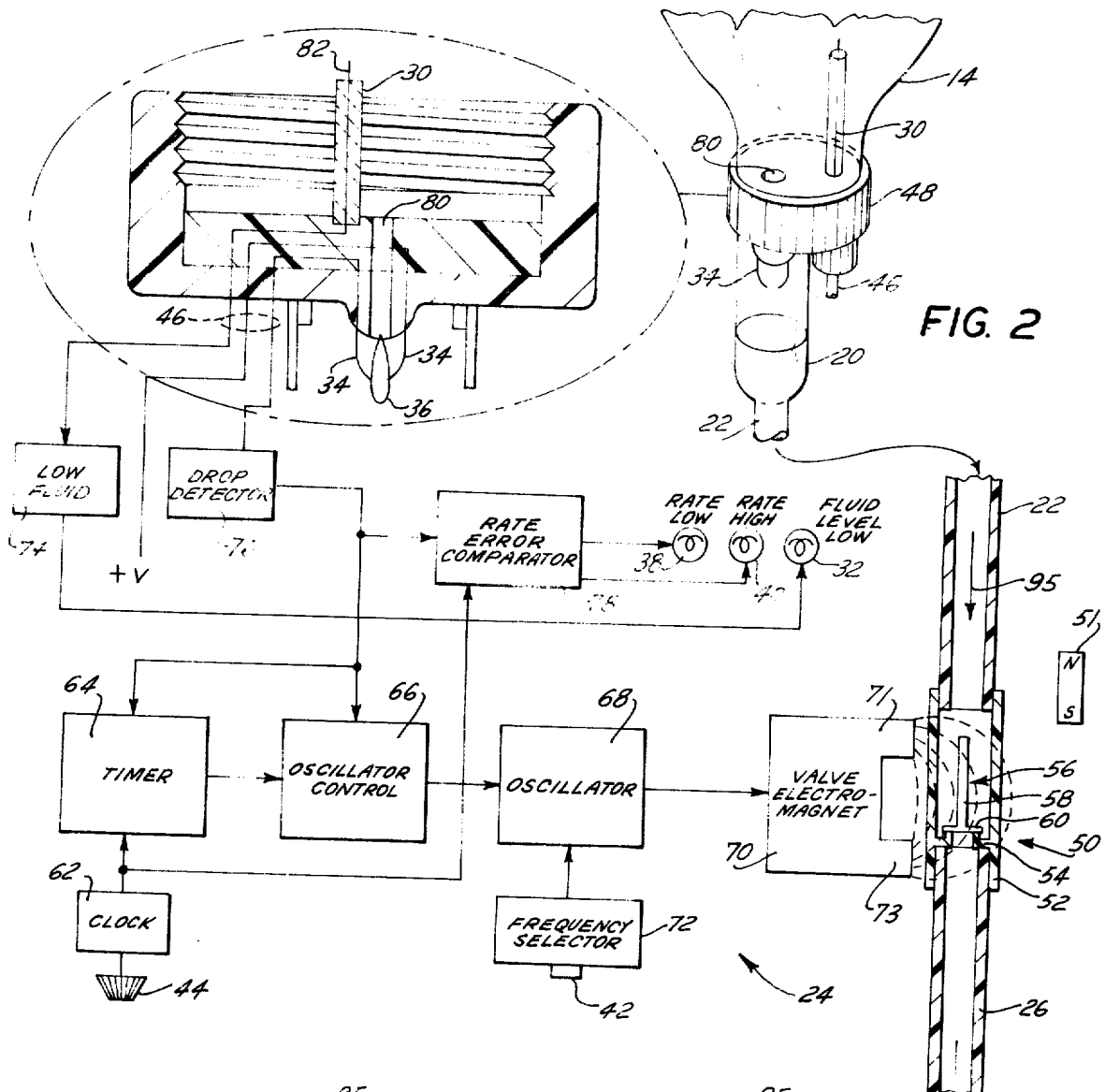
FIG. 2 is a schematic diagram of the system shown in FIG. 1.
Figures 3, 4, 5, 6:
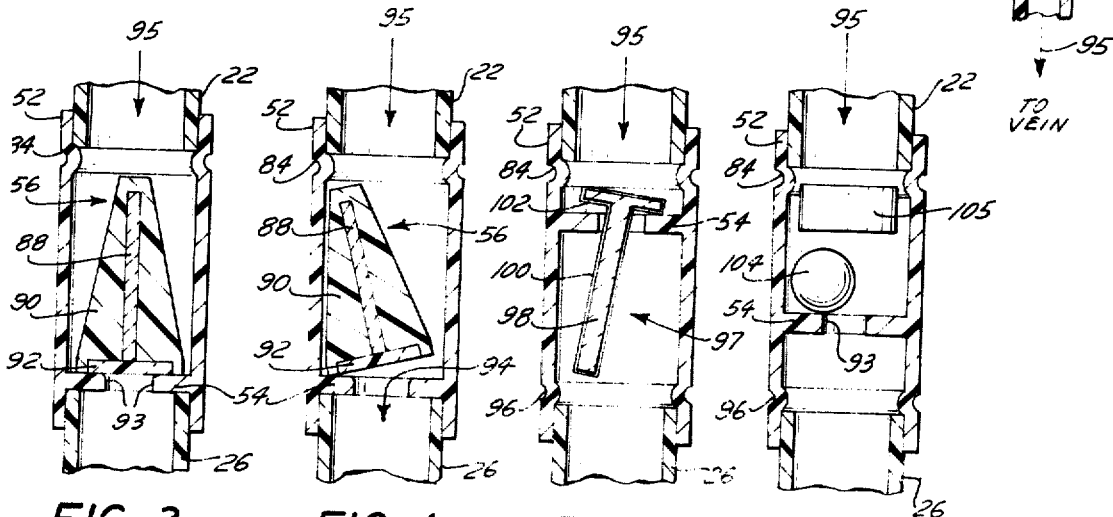
FIGS. 3 and 4 show the preferred embodiment of a portion of a valve of the system shown schematically in FIGS. 1 and 2.
Figure 8:
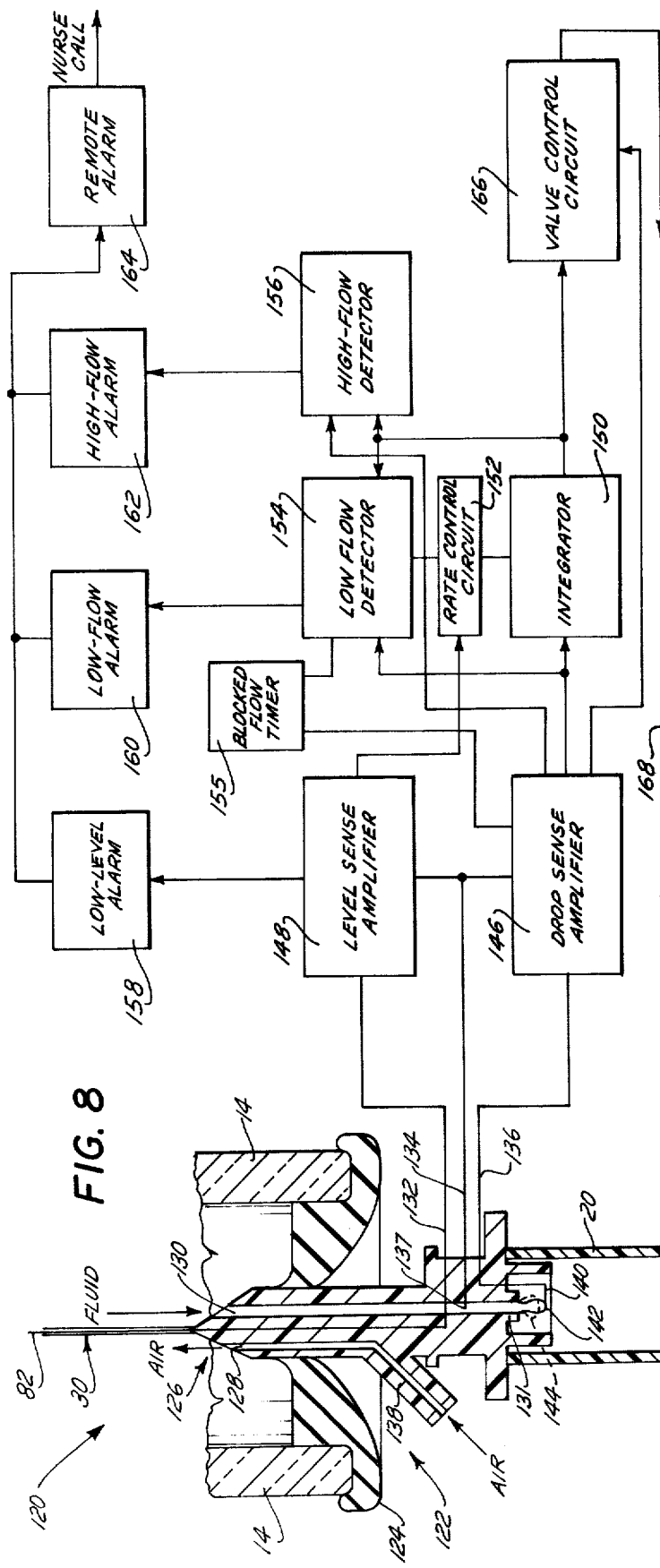
Figure 10:
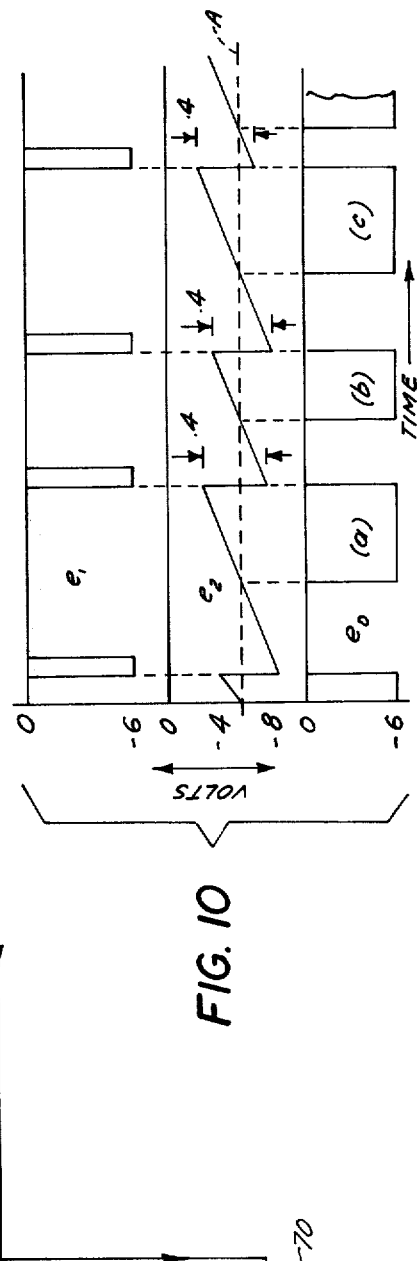

FIGS. 5 and 6 each show an alternative embodiment of the valve of the system shown in FIGS. 1 and 2;

FIG. 7 is a waveform diagram showing qualitatively the timing of various electrical signals in the system shown in FIGS. 1 and 2;

FIG. 8 is a partially cross-sectional, partially schematic diagram of the preferred embodiment of the invention;

FIG. 9 is a more detailed schematic diagram of a portion of the system shown in FIG. 8; and FIG. 10 is a waveform diagram showing various electrical signals in the system shown in FIGS. 8 and 9.

GENERAL OPERATION

FIG. 1 shows the parenteral fluid flow controller 10 of the present invention in use in controlling the feeding of parenteral fluid from a reservoir bottle 14 to a patient 12. The bottle 14 hangs from a vertical post 18 by means of a bail 16. Fluid flows from the bottle 14 into a drip chamber 20 drop-by-drop, and then flows through a flexible tube 22 to a control unit 24 which controls the flow through the tube, and then through another tube 26 through a needle (not shown) into the veins of the arm 28 of the patient 12. The control unit 24 is attached to the post 18 by means of a clamp 25.

A pair of electrodes 34 is provided for detecting the formation of drops 36 as they flow out of the bottle 14 into the drip chamber 20. A dial 44 is provided on the front of the control unit 24 for setting the flow rate of parenteral fluid at a desired value, in units of milliliters or drops per hour, or in other convenient units. The control unit performs a rate comparison function so that if the drop formation rate, and hence, the fluid flow rate, is greater than the rate set on the dial 44 by more than a certain amount, a lamp 40 is lighted to indicate this condition to a nurse or other attendant. Similarly, if the flow rate is less than the set rate by more than a certain amount, another lamp 38 lights to indicate this condition. Another lamp 79 lights once for each drop of fluid which falls into the drip chamber 20. The signals from the drop detector electrodes 34 and a fluid level sensor 30 are conducted to the control unit 24 through a small cable 46.

The fluid level sensor 30 extends upwardly into the upside-down bottle 14. When the level of fluid in the bottle falls below the upper tip of the electrode 30, a lamp 32 on the control unit 24 lights to tell a nurse that the fluid level is low and that the bottls should be changed, or that the patient has received enough fluid.

Alarms other than the lamps 38, 40 and 42 can be provided, if desired. Also, the alarm signals can be transmitted by means of wires or wireless communication to a central station where the operation of many such systems can be monitored conveniently.

FIG. 2 is a schematic diagram of the parenteral flow controller 10 shown in FIG. 1. The details of the operation of the controller will be explained with reference to FIG. 2 as well as FIG. 1.

MAGNETIC CHECK VALVE

Referring now to FIG. 2, the flow of parenteral fluids through the tubes 22 and 26 into the patient's vein is controlled by means of a magnetic check valve 50. The valve includes a normally vertical valve housing 52 made of non-magnetic material such as plastic (acrylic resin, e.g.). The ends of the tubes 22 and 26 are fitted into the ends of the housing 52. An annular flange 54 is provided inside of the housing to form a valve seat, and a movable valve member 56 is provided. The valve member 56 has a generally T-shaped cross section, with an elongated stem or shaft 58 extending upwardly in the housing, in a direction parallel to the direction of flow. The valve member 56 also has a lower laterally-extending base portion 60 which normally rests on the valve seat 54 to close the valve. The pressure produced by the fluid in the tube 22 and the upper portion of the housing 52 forces the valve member against its seat, thus forming a check valve. Even if there were no liquid in the tubes 22 or 26, gravity would hold the valve member against its seat.

An electro-magnet 70 is located near one side of the housing 52. The electro-magnet 70 has two pole pieces 71 and 73 which set up a magnetic field in and through the valve housing 52. The general outlines of the magnetic field created by the electro-magnet 70 are indicated by dashed lines 75.

The upstanding stem portion 58 of the valve member 56 is made of magnetic material such as iron or the like coated with an inert plastic material in order to prevent chemical reaction between the metal and the parenteral fluids. When the electro-magnet 70 is energized, the magnetic field it creates pulls on the magnetic stem 58 and tips the valve member 58 to the left until the valve stem 58 touches the side walls of the housing 52. This creates an opening which allows fluid to flow through the check valve. Then, when the electoi magnet 70 is de-energized, the pressure of the fluid i the tube 22 and the upper portion of the housing 52 ti the valve member 56 back to its upright position, thu closing the valve again.

FIGS. 3 and 4 show the preferred form of the valv housing 52 and valve member 56. FIG. 3 shows th valve member 56 seated on the valve seat 54, and FIG 4 shows the valve member 56 tipped over to provide a opening 94 for the flow of fluid through the valve.

The housing 52 has a circumferential indentation 8. which acts as a stop to prevent the insertion of the tub 22 too far into the valve housing.

The valve member 56 preferably includes a soli plastic body 90 made of a light plastic material such a an acrylic resin. The member 56 has the shape of truncated cone with an elongated iron or steel rod 8 extending longitudinally in the center of the body 9( In the bottom of the valve member 56 is a soft rubbe disc 92 which forms a resilient, fluid-tight seal when is forced against the rounded edge 93 of the valve sea The shape of the valve member 56 is highly advant: geous in that it utilizes the forces created by the flo of fluids in the direction indicated by the arrows 95 t aid in the opening and closing of the valve. This re duces the amount of power required to drive the elec tro-magnet 70, and permits the size of the control un 24 to be minimized. As soon as the electro-magnet tip the valve member 56 slightly away from its seated pos tion, the flow of fluids through the opening 94 create forces on the sloping surface of the body 90, thus creat ing a lateral force component tending to hold the valv member 56 against the side wall of the housing 52 anc together with the magnetic force, hold the valve oper However, the force created by the flowing fluids is nc enough to hold the valve open by itself; the magneti force also is required.

When the magnetic force is removed, the forces cre ated on the body 90 by the downward pressure of th fluid above the valve member tend to pivot it back t its original vertical position and thus close the valv rapidly and tightly. The pressure of the fluid then hold the valve closed until the electro-magnet again is enei gized.

The valve member 56 is made as light in weight a possible. The reason for this is that, unless the valv member is too heavy, it has been found that the pres sure of the parenteral fluid in the line 22 and housin 52 is entirely sufficient to hold the valve member 5 against its seat even when the valve is turned com pletely upside-down. The use of the solid acrylic bod 90 and iron rod 88 produces a valve member which i sufficiently light in weight to perform in this manner.

The rod or stem 88 preferably is made of a low-cos material, such as soft iron, which has relatively hig permeability and relatively low retentivity. It is pre ferred that the stem not be permanently magnetized b the electro-magnet 70.

An altenative embodiment of the valve is shown i FIG. 5. In this embodiment, the flange 54 forming th valve seat in the housing 52 is located at a positio higher than its position in the structure shown in FIGS 3 and 4. Another indentation 96 is provided at th lower end of the housing to seat the end of the tube 26.

The valve member 97 has a T-shaped cross section like the valve member shown in FIGS. 2 through 4, and has a plastic coating 100 over a stem 98 of magnetic material. A resilient protective coating 102 forms a seat portion on the head portion of the valve member 97.

In the embodiment shown in FIG. 5, the stem 98 extends downstream with rspect to flow through the valve instead of upstream as in the FIGS. 2 through 4 embodiment. However, its operation is substantially the same as that of the previous embodiment except that the flow forces do not tend to aid in opening the valve as they do in the FIGS. 2 through 4 embodiment.

Another alternative embodiment of the valve is shown in FIG. 6. In the FIG. 6 embodiment, the valve member is a plastic-coated ball 104 made of magnetic material. The ball is shown in its unseated position. Whenever the electro-magnet 70 is not energized, the ball is seated on the valve seat 54 to block flow of fluid. However, when the electro-magnet is energized, the ball pivots on the edge 93 of the seat 54 so that it is pulled upwardly away from the seat and against the left side wall of the housing 52 to open the valve. The location of the pivot point 93 is to the left of the center of the ball so that it again is pushed onto the seat whenever the magnetic field is removed.

A float member 105 also is provided in the chamber 52. The buoyancy of the float member 105 is sufficient so that when the valve is turned upside down the float will force the ball 104 against its seat 54 and keep the valve closed despite having been turned upside down.

In each of the embodiments of the magnetic valve, the movable valve member 56, 97 or 104 is pulled laterally to unseat it. The side wall of the valve housing serves as a barrier preventing movement of the valve member beyond a point at which it would continue to rest against the barrier and hold the valve in an open condition. In other words, the barrier holds the valve member in a position of unstable equilibrium so that it will invariably be pushed back onto the valve seat when the magnetic flux is removed, thus assuring proper operation as a check valve. The barrier holds each valve member in a position such that fluid flow through the valve tends to force the valve member towards its seat. This feature is important to the safety of the patient when the valve is used in a parenteral fluid administration system, since it assures that the tube leading to the patient's veins will be closed if the electrical power supply for the controller fails, or if the controller accidentally becomes disconnected from the valve. This also will prevent dangerously high flow rates of fluid to the patient's veins.

It should be understood that the term "magnetic material " as used in this description includes not only iron and other ferrous metals, but also includes permanently magnetized material. For example, in another embodiment of the invention, if the valve stem 58 is a permanent magnet, the valve may be opened merely by bringing a piece of soft iron up against the outside of the housing 52, the magnetic attraction between the iron and the permanent magnet causing the tipping of the valve member 56. As explained above, however, it is preferred that the magnetic flux source be outside the flow conduit, and that the stem 88 not be permanently magnetized.

In another embodiment of the invention, also shown in FIG. 2, the valve may be held open for long periods of time for purging the system or similar purposes by merely bringing a permanent magnet 51 up against the outside of the valve housing 52. This will hold the valve stem 58 against the side of the housing and hold it in an open position for as long as desired.

CONTROL CIRCUIT

The control circuit of the parenteral control system 10 is shown in FIG. 2. The dial 44 of the control unit 24 (see FIG. 1) controls the frequency of clock pulses produced by a conventional clock source 62. The clock pulses are fed to a timer 64 which delivers the clock pulses to an oscillator control circuit 66. The oscillator control circuit 66 turns a conventional oscillator 68 off and on. The oscillator drives the electro-magnet 70.

A frequency selector device 72, which is operable by means of button 42 on the front of the control panel of the control unit 24 (see FIG. 1), permits setting the frequency of the oscillator at at least two different values. The frequency selector 72 preferably is a switch for connecting one of two different resistors in the conventional oscillator circuit 68.

The upper portion of FIG. 2 shows, schematically, the screw cap 48 which fits onto the bottle 14. The screw cap is made of insulating material and has at least one orifice 80 through which the parenteral fluid flows to form drops 36. The cap 48 also has an air vent (not shown) to permit air to enter the bottle as the liquid flows out of the bottle.

The drop detector electrodes 34 are spaced apart by a distance such that each drop 36 will touch both electrodes 34 as it is formed. The conductivity of most parenteral fluids is relatively high. Thus, each drop forms a conductive path between the electrodes 34 and closes a circuit between a positive voltage source V and a drop detector circuit 76 which produces an output pulse whenever any drop is detected. The voltage V of the source is kept relatively low, e.g., preferably below 1.2 volts, in order to prevent electrolysis of the fluid.

Each pulse produced by the drop detector 76 is sent to the oscillator control circuit 66 and to the timer 64. The oscillator control circuit 66 operates to turn on or enable the oscillator 68 upon the receipt of a clock pulse, and to turn the oscillator 68 off upon the receipt of a drop pulse from the drop detector 76. Thus, the length of time during which the oscillator is turned on is a function of the drop formation rate. This function is such that the drop formation rate is maintained at the rate of the formation of the clock pulses by the clock source 62. Since the pulse rate of the clock 62 can be maintained very precisely, it is possible to control the drop formation rate, and, hence, the flow rate to the veins of the patient with a relatively high degree of accuracy.

FIG. 7 shows qualitatively the timing relationships between the clock pulses 106, the drop pulses 114, 116 and 118, and the bursts 108, 110 and 112 of output pulses from the oscillator 68. The timing of these pulses is shown in relation to the times of formation of the drops 36.

The leading edge of the first pulse 106 turns the oscillator 68 on. Preferably, in this embodiment of the invention, the frequency of the oscillator 68 is several times the frequency of the drop formation. The oscillator continues to produce pulses until a drop is formed and a drop pulse 114 is created to turn off the oscillator. In the meantime, the oscillations of the oscillator have repeatedly energized and de-energized the electro-magnet 70 so as to repeatedly rock the valve member 56 back and forth on its valve seat. Each such rocking movement allows an increment of fluid to pass through the valve. The frequency and amplitude of the output of the oscillator 68 preferably are fixed during any particular time of operation. Thus, the amount of fluid flowing through the valve depends upon the number of cycles in the burst of output oscillations of the oscillator 68 during any period of operation.

The control circuit is believed to operate in a feedback mode substantially as follows. The rate of drop formation depends upon several factors. One factor is the level of fluid in the bottle 14. Another factor is the pressure. The drip chamber is air-tight, and the pressure inside the chamber can oppose or assist in the formation of drops at the outlet of the opening 80. If the chamber 20 is relatively full, the air in the chamber will be compressed and will provide back-pressure which reduces the rate of drop formation. On the other hand, if the fluid level in the chamber 20 is low, the air pressure will be relatively low and drops will form considerably faster.

The back-pressure in the drip chamber 20 can change due to a change in the back-pressure from the patient's veins. An increase of such back-pressure might occur, for example, when the patient coughs or rolls over, or when an infant patient crys.

In any event, if the drop formation rate slows down, as is exemplified by the greater time between the first and second drops than between the second and third drops in the schematic diagram of FIG. 7, a longer burst 110 of oscillations from the oscillator will be delivered to the electro-magnet, thus allowing a greater number of increments of fluid to flow through the valve 50. This reduces the pressure in the drip chamber 20, and allows a subsequent drop to from more quickly. This causes the next burst 112 of oscillations from the oscillator 68 to be shorter than the preceeding burst 110. Eventually, equilibrium is reached between the drop formation rate and the length of the oscillator bursts so that the drop formation rate is synchronized with the clock pulse rate.

As is shown in FIG. 2, the clock signal and the drop detector signals are both fed to a rate error comparator circuit 78. The comparator 78 includes counters for counting the drop signals and the clock signals, and means for comparing the counts on the counters. If the rate of drop formation is more than about ten percent below the clock rate, an output signal is delivered to the lamp 38 to light it and thus indicate that the drop formation rate is too low. If the rate of drop formation is more than about ten percent higher than the clock rate, an output signal is delivered to the lamp 40 to indicate that the drop formation rate is too high. A nurse or other attendant can see that either lamp 38 or 40 is lighted and can make an appropriate correction of the situation. The 20% "deadband" of the comparator 78 is provided in order to prevent the lamps from lighting when only one or two drops were skipped when a patient coughed or rolled over, or when the drop formation rate temporarily was too high.

The drop detector signals are sent to the timer 64 as well as to the oscillator control circuit 66. The drop pulses operate the timer to reset it each time a pulse is delivered. If no pulses are delivered for a predetermined length of time, the timer will deliver a disabling signal to the oscillator control circuit and the oscillator 68 to totally disable the oscillator and close the valve 50, thus preventing fluids from flowing into the patient's veins. Of course, the "rate low" lamp 38 is lighted because the rate of drop formation has fallen below the desired level. This indicates trouble which an attendant can attend to. Thus, the timer 64 will permit the valve to automatically close itself and prevent air from reaching the patient's veins if the fluid should be completely exhausted from the bottle 14, or if there is a blockage in the flow of fluid from the bottle. The period during which the timer 64 is set to operate is approximately the length of time required for the drip chamber 20 to be completely drained.

As it was mentioned above, the valve 50 provides a safety feature in that if the electrical power to the controller should fail, the valve automatically is closed by the normal mechanical forces on it, so that excessive amounts of fluid or air cannot reach the patient's veins.

The frequency selector 72 is provided in order to match the frequency of the oscillator to the desired size of drops being formed. Some types of caps 48 have two drop outlets 80 instead of one, the size of the orifice of the two outlets being different. The nurse or doctor can select which orifice is desired.

The frequency selector is provided in order to decrease the frequency of the oscillator for large drops and to provide a higher frequency when small drops are being formed. Since the flow rate through the valve 50 is a direct function of the oscillator frequency, increasing the frequency increases the flow rate through the valve and vice versa. Thus, adjustment of the frequency selector enables the setting of the dial 44 to remain the same despite the change in the size of drops.

The level detector electrode 30 includes an insulating rod and an electrode wire 82 extending upwardly from the rod. The wire 82 is connected to an energization circuit 74 for lighting the lamp 32. When the conductive fluid contacts the wire tip 82, a circuit is completed and the lamp is de-energized. However, when the fluid recedes below the tip 82, there is not conductive connection of the fluid to the wire 82 and the circuit 74 energizes the lamp 32.

The use of the magnetic check valve 50 is highly advantageous. The amount of electrical energy needed to open the valve is relatively small. Therefore, the control unit and electro-magnet can be relatively compact. Furthermore, the valve 50 does not depend upon the squeezing or clamping of the flexible tube 22 or 26. Also, the operation of the valve does not require access holes in the tubes so that they can remain sealed against contamination.

Another advantage of the invention is that the flow through the check valve in increments rather than steadily is similar to the incremental drop-by-drop flow of fluid from the bottle 14. It is believed that the size of both such increments depends upon viscosity in approximately the same way. Thus, changes in the flow through the valve and in the drop formation rate due to viscosity changes roughly compensate for one another. Furthermore, the fluctuation of the valve member of the valve is believed to help keep the valve free from cloging. Although the use of the oscillator is not believed to be necessary, its use does allow the drop size to be changed without changing the setting of the flow rate knob 44.

PREFERRED EMBODIMENT

FIGS. 8 through 10 illustrate the preferred embodiment of the parenteral fluid flow controller of the present invention. Many of the components of this embodiment are the same as in the embodiment already described. Accordingly, the same reference numerals will be used to identify the same elements.

ENTRY UNIT

Whereas the flow controller previously described uses a screw-type cap 48 for the fluid reservoir bottle 14, the embodiment shown in FIG. 8 utilizes a fluid reservoir bottle 14 which is sealed by a rubber cover 124. A container entry or puncture unit 122 is provided. The unit 122 has a pointed end 126 which is pushed into the bottle through the rubber cover 124, thus puncturing a hole in the cover and forming a secure seal around the body of the entry unit 122.

The pointed end 126 of the entry unit 122 has three conduits. One conduit 128 admits air into the container through a breather tube 138. Fluid from the bottle flows through a conduit 130 which passes through the entry unit and has an exit opening with an annular lip 131 around it. The lip 131 serves as a drop formation surface. A third conduit (not shown) is filled by the level detector electrode 30, which consists of a conductive rod or wire whose tip 82 extends upwardly from an insulating coating to serve as the fluid low-level detector electrode.

Three electrical terminals 132, 134 and 136 extend laterally otwardly from the non-conductive plastic body of the entry unit 122. The uppermost terminal 122 is connected to the lever sensor wire 82 through the insulating material of the entry unit 122. There is no connection between this terminal and the fluid within the entry unit 122.

The second terminal 134 has a conductive tip 137 which extends into the fluid flow conduit 130, and thus makes contact with the fluid flowing out of the bottle.

The third terminal 136 passes through the insulation of the entry unit 122, extends downwardly through the bottom of unit 122, and has a tip 140 psoitioned just below the outlet of the fluid flow conduit 130.

The drip chamber 20, conduits 22 and 26, the valve unit, and the electromagnet 70 are identical to the corresponding elements in the embodiment of FIGS. 1 and 7.

The central electode 134 in the entry unit 122 provides means for making electrical contact with the fluid in the bottle 14 as well as in the outlet conduit 130. Thus, the electrode 137 serves as one terminal of the low fluid level detector circuit. The terminal 137 also serves as one terminal of the unique drop detector of this invention.

DROP DETECTOR

In the drop detector shown in FIG. 8, the drop detector electrode tip 140 is spaced below the bottom of the lip 131 by a distance such that a drop 144 (shown in dashed outline) which still is forming is not long enough to make contact with the tip 140. However, the tip 140 is close enough to the lip 131 so that after the drop starts lengthening and stretching to the shape indicated in solid outline 142, but before the drop completely separates from the lip, the lower portion of the drop touches the tip 140 and creates a momentary liquid path between the tip 140 and the electrode 137. Since the parenteral fluid (a saline or dextrose solution or the like) usually is of relatively high conductivity, a low-resistance path thus is formed momentarily between the electrodes 140 and 137. This permits current to flow from a current source through the liquid and the electrodes 137 and 140 to create an electrical signal indicating that a drop has fallen.

One advantage of this drop detector is that droplets which splash back upwardly when a drop falls into the liquid in the drip chamber 20 almost never are elongated enough and properly positioned to make contact between the liquid flowing out of the conduit 130 and the electrode 140. Thus, there are substantially no false detections of drops due to splashing.

Another advantage of this detector is that the time duration of the completion of the path between the electrodes 140 and 137 is relatively uniform. For example, for the parenteral fluids mentioned above, the time duration of the drop detecting event usually is about 50 miliseconds, and is relatively constant.

A further advantage of the drop detector just described is that it is very difficult, if not impossible, for a partially-formed drop to become suspended in a position in which it makes contact with the electrode 140 but does not fall. This is true because the drop is not detected until the process of separating it from the upstream fluid has started and is essentially irreversible. Thus, it is virtually impossible for the detector to erroneously indicate the continuous formation of drops.

FLOW CONTROLLER

FIG. 8 also includes a block diagram of the flow controller circuit of this preferred embodiment of the invention. The control circuit includes a "drop sense amplifier" 146 which amplifies the drop detector signals and delivers corresponding signals to an integrator circuit 150. The ouput of the intergrator is delivered to a "valve control circuit" 166 whose output drives the coil of the electromagnet 70 with direct current pulses whose time duration and repetition rate vary, but whose magnitude is constant. The integrator 150, whose operation is controlled by a "rate control circuit" 152, controls the time rate of opening and closing of the valve so that it opens and closes once for every drop detection.

A "level sense amplifier" 148 amplifies the signal produced when the fluid level is too low and actuates a "low-level alarm" circuit 158 which causes the lamp 32 (see FIGS. 1 and 2) to light to indicate a low level of fluid in the bottle 14.

A "low flow detector" circuit 154 and a "high flow detector circuit" 156 are provided. Each drives a corresponding alarm circuit 160 or 162 to light a lamp 38 or 40 to indicate that the fluid flow rate is more than a pre-determined amount below or above a desired level. The flow rate level is set by the adjustment of the knob 44, which adjusts the rate control circuit 152.

Each of the alarm circuits 158, 160 or 162 will operate a remote alarm circuit 164 which will send a signal to a nurse's call station to alert the nurse or other attendant to attend the patient and correct the problem.

A "blocked flow timer" circuit 155 is provided to automtically ensure that a certain minimum fluid flow rate to the patient is maintained so that the patient's vein will be irrigated to prevent clotting of the administration needle.

FLOW CONTROLLER CIRCUIT IN DETAIL (FIG. 9)

FIG. 9 shows in detail a circuit which actually has been built and was found to perform successfully the control functions described above with respect to FIG. 8.

The control knob 44 (FIG. 1) is connected to the wiper arm 200 of a potentiometer 198 which is an element in the rate control circuit 152. The control knob 44 also operates a line switch 252 to turn the unit off and on. The potentiometer has a fully counterclockwise position marked CCW and a fully clockwise position marked CW in FIG. 9. The switch 252 is open when the potentiometer knob is in the CCW position. Turning the knob clockwise closes the switch 252 and connects a power supply 165 to the control circuit.

The power supply includes a rechargeable 6.25 volt battery 250 which is connected in series with a rectifier diode 248, a resistor 246, and the secondary winding of a power transformer 244. The primary winding of the transformer 244 is connected to a plug 242 which can be plugged into a common 3-wire household 60 Hz., 110 volt power outlet. The battery 250 is of a known type which is used as a ripple filter to smooth the halfwave rectified a-c at the battery terminals. Thus, with the switch 252 closed, a voltage of approximately 6 volts is supplied between the terminals 134 and 170. Terminal 170 is maintained at ground or zero potential, and the terminal 134 is maintained at negative 6 volts. The terminal 134 provides a common terminal for much of the control circuitry, and the line 170 provides a positive bias voltage with respect to the line 134.

It should be understood that it is preferred that that a-c power from a household or other supply should be used whenever possible instead of the battery 250. Other than serving as a ripple filter, the battery is intended primarily for emergency service or portable service where there is no conventional power supply readily available.

The three detector terminals are connected to the entry unit 122 terminals by means of a jack 135. The drop detector terminal 136 is connected to a bias resistor network consisting of resistors 172 and 174. The upper terminal of this combination is connected to the line 170. Thus, when the electrodes 140 and 137 are connected together briefly through the liquid as a drop is falling, a 6 volt signal is connected across the resistor combination 172-174. This turns on two cascaded transistor amplifier stages 176 and 178, and, through bias resistors 180 and 182 turns on a third amplifier transistor 188.

INTEGRATOR CIRCUIT

A capacitor 190 is connected at the output of the amplifier circuit 146, with one terminal (the plus terminal) connected to the collector of transistor 188 is turned off, the plus terminal of capacitor 190 is charaged to zero volts, which is a positive voltage with respect to its right hand (negative) terminal. The charging current flows through a light-emitting diode (LED) 186 and a resistor 184 which are connected to the power supply line 170. When the transistor 188 is turned on by the receipt of a drop detection pulse, the charge stored on capacitor 190 is delivered suddenly to the integrator circuit 150.

The light-emitting diode (LED) 186 is exposed at the front panel of the control unit 24 shown in FIG. 1 and is represented by the reference numeral 79. It emits a preferably green light for the short period of time during which each drop detection pulse is received. Thus, the proper operation of the fluid in the adminsitration system can be checked visually by the nurse or doctor, or other attendant, or even by the patient himself, merely by noting the continued green light flashes indicating that drops are falling.

The use of a light-emitter diode instead of the lamp used in the embodiment of FIGS. 1 through 7 is advantageous in that such diodes have far longer lives than most lamps.

The integrator circuit 150 includes a capacitor 192 and a series resistor 206 which is connected in series with the resistance of the potentiometer 198. The wiper arm 200 of the potentiometer 198 is connected through a transistor 293 in the low fluid level sense amplifier 148 to the supply line 170. The transistor 293 is normally turned on, and is turned off only when the fluid level in the reservoir is below the tip 82 of the level sensor 30. Thus, the wiper arm 200 normally is connected to a voltage source which is positive with respect to the voltage at the bottom terminal of the integrator capacitor 192.

The resistor 206 and potentiometer 198 continuously remove charge from the capacitor and thereby tend to increase the voltage $e_2$ on the upper (positive) terminal of the capacitor 192.

A diode 194 is connected between the positive terminal of capacitor 192 and the negative terminal of capacitor 190. A clamping diode 196 is connected to the junction between the diode 194 and the negative terminal of the capacitor 190.

When the transistor 188 is turned off, the positive terminal of capacitor 190 is at zero volts, whereas the negative terminal is at around -5.2 volts. When the transistor 188 turns on, a low-impedance path is connected between the positive terminal of capacitor 190 and the negative 6 volt terminal 134. Thus, the voltage on the positive terminal is suddenly changed from zero to negative 6 volts. The negative terminal of capacitor 190 then attempts to become more negative to compensate for this sudden change. However, after the negative voltage drops by about 0.4 volt, the diode 194 becomes forward-biased, and the charge stored on capacitor 190 is then transferred to the capacitor 192. This sudden transfer of charge to the capacitor 192 causes a corresponding drop in voltage $e_2$. However, capacitor 102 has a capacitance which is about 15 times that of capacitor 190. For example, capacitor 192 is 47 microfarads and capacitor 190 is 3.3 microfards. Therefore, the voltage $e_2$ drops by only about 0.4 volt.

As has been noted above, the drop detector pulse usually is only about 50 milliseconds in time duration. When it ceases, transistors 176, 178 and 188 are turned off, and the positive terminal of capacitor 190 again is returned suddenly to zero volts. The negative terminal of capacitor 190 thus attempts to rise in voltage by a corresponding amount. However, diode 194 quickly becomes back-biased, diode 196 becomes forward biased, and, in conjunction with the resistor 212, clamps the negative terminal of capacitor 190 once again at approximately negative 5.2 volts. The capactior 190 then is recharged quickly through the LED 186 and the resistor 184 to ready the capacitor for another drop detection pulse.

As has been noted above, charge is continuously withdrawn from the capacitor 192 at a rate determined by the setting of the potentiometer 198 by means of the knob 44. Thus, immediately after the sudden decrease in voltage $e_2$, it increases substantially linearly in a ramp waveform, as is shown in FIG. 10, until the next drop pulse is detected. FIG. 10 shows the drop detector pulses $e_1$ in their time relationship with the excursions of the integrator output voltage $e_2$ and the output voltage $e_0$ which is applied to the electromagnet coil 70 to open the valve. It can be seen that the amount of charge delivered to the capacitor 192 from the capacitor 190 is always the same so that the drop in voltage $e_2$ for every drop detection is the same.

VALVE CONTROL CIRCUIT

The integrator output $e_2$ is supplied to the input of the valve control circuit 166. Specifically, the voltage $e_2$ is supplied to the base lead of a transistor 208 which is connected to the resistors 210 and 212 to form a level-detector circuit. The level to which the voltage $e_2$ must rise in order to turn on transistor 208 is indicated by the dashed line A in FIG. 10.

When transistor 208 turns on, this turns on two other transistors 222 and 228. A resistor 218 is connected between the collector of transistor 222 and the collector of another transistor 216 which normally is turned off. The lower end of resistor 218 is connected to the base lead of another transistor 232 and to a bias resistor 234 whose other end is connected to the negative 6 volt line 134. Before transistor 222 is turned on, its collector voltage is approximately negative 6 volts. However, when transistor 222 is turned on, its collector voltage rises to nearly zero, supplying a bias signal on resistor 234 which turns on the transistor 232.

The collector lead of transistor 232 is connected to the negative terminal 236 of the electromagnet coil. Hence, when the transistor 232 is turned on, the voltage on terminal 236 changes from zero to negative 6 volts. The positive terminal 238 of the electromagent coil is connected to the zero voltage line 170 through the transistor 228. Thus, when the transistor 232 is turned on, the system supplies direct current to the coil of electromagnet 70.

If operation of the system is normal, fluid will flow through the now open valve for from 100 to 250 milliseconds, at which time another drop is detected. When that next drop is detected, the transistor 176 is turned on again. The collector of transistor 176 is connected through a resistor 180 to the base of transistor 216. Thus, transistor 216 is turned on. This short-circuits the bias on transistor 232 to negative 6 volts, thus turning transistor 232 off and ending the energization of electromagnet 70, and allowing the valve to close.

FIG. 10 shows the output voltage $e_0$ pulses which are produced by the above-described system during normal operation. It is to be noted that the magnitude of the $e_0$ pulses is constant. However, the time duration and time separation between pulses varies with varying conditions of the system.

As it has been noted above, the time between formation of drops varies with a number of different parameters. However, the control circuit compensates for variations in the drop formation rate by increasing or decreasing the flow rate through the valve so that the average flow rate through the valve is the desired flow rate as set by the knob 44. For example, referring again to FIG. 10, if the first two drop pulses $e_1$ are too far apart, indicating a flow rate below the desired level, the voltage $e_2$ rises for a longer period of time than normal to a higher voltage than it reached in the previous excursion, and the output pulse (a) has a longer time duration, thus allowing more fluid to flow through the valve. Since the system is a closed loop servo system, the greater flow causes the next drop to form more quickly. However, since the voltage $e_2$ rose to a higher level during the previous excursion, the voltage level A necessary to start the next output pulse (b) is reached earlier than previously. The net effect is to make the pulse (b) of shorter time duration, and reduce the flow through the valve. Similar variations are effective in the determination of the time duration of the next output pulse (d) and subsequent pulses. The fluid flow rate thus is made directly proportional to the drop formation rate.

RATE CONTROL CIRCUIT

The rate control circuit 152 includes the potentiometer 198 and resistor 206, as well as resistors 202 and 204, each of which is tapped into the potentiometer resistor at a pre-selected point. The opposite terminals of the resistors 202 and 204 are connected together and to the common point between the diodes 194 and 196. This arrangement is used to give the potentiometer 198 an approximately logarithmic variation in its setting, with a range of about seven octaves, so that the dial associated with the knob 44 will read in milliliters per hour.

Referring again to FIG. 10, for a given setting of the potentiometer 198 to control the flow at a set rate, the slope of the ramps in the voltage $e_2$ at the output of the integrator is constant. However, that slope will change for any change in setting of the potentiometer 198, with the result that the time separation between the output pulses $e_2$ will be increased or decreased in accordance with an increase or decrease in the desired set flow rate.

SAFETY FEATURES

One of the safety features of the invention assures that the electromagnet coil 70 will not remain energized for more than 250 milliseconds, thus assuring that for each drop signal received the valve will be turned on and off again. This feature prevents the valve from being held in the open position by faulty electronics or a blockage in the flow of fluid to the patient causing a substantial delay in the formation of the next drop.

This automatic turn-off feature is provided by the combination of a resistor 226, which is connected to the negative terminal 236 of the electromagnet coil and to the collector of transistor 232, together with a capacitor 220 and a transistor 224. The capacitor 220 and the resistor 226 together form a timing circuit. When transistor 222 turns on, the negative terminal of capacitor 220 rises with the collector of transistor 222 from negative 6 volts to just less than zero volts. Prior to turn on of the transistor 222, the plus terminal of the capacitor 220 is connected to zero volts through resistor 226, a electromagnet coil 70 and a relatively large resistor 240. However, when transistor 222 switches on, the plus terminal of capacitor 222 rises to approximately +5.4 volts, and the transistor 232 turns on, thus connecting the lower terminal of resistor 226 to negative 6 volts. The capacitor 220 then starts discharging through resistor 226.

If transistor 232 is turned off by the receipt of the next drop pulse prior to the decay of the voltage on capacitor 220 to a level sufficient to turn on transistor 224, the circuit will operate in the normal mode described above. However, if another drop pulse signal has not been received within 250 milliseconds, the voltage on capacitor 220 will decay to a level at which transistor 224 is turned on.

The conductive path provided by the transistor 224 short-circuits the base-emitter path of transistor 228 and turns if off. Current from the line 170 to the electromagnet coil then must flow through the relatively large resistor 240. This drives the plus terminal 228 of the coil 70 suddenly to negative 6.6 volts, thus eliminating the output signal $e_0$ and allowing the valve to close. The negative 6.6 volts changes to about negative 6 volts after the energy stored in the magnetic field of the coil has dissipated. However, the coil remains deenergized and the valve remains closed until the reset circuit to be described below resets the integrator and enables it to operate again in the normal manner, and another drop pulse is received.

The resistor 214 is connected between the negative terminal 236 of the electromagnet coil and the emitter of transistor 208 to furnish positive feed-back from transistor 232 to transistor 208 and thus enhance the turn-on of transistor 232 and the energization of the coil.

Each time the fail-safe circuitry described above operates, there is developed a negative-going excursion of the collector voltage of transistor 228 which does not occur in normal operation. This negative excursion is used as a missed drop indicating signal to a missed drop detector and compensation circuit which will be described below.

As it was pointed out above, the dial for the front panel control knob 44 (see FIG. 1) is calibrated in millileters per hour. Since the flow rate through the valve is directly portional to the charge transfer rate or current flowing out of the integrator, and since the current flowing out of the integrator is quasi-logarithmic function of the setting of the potentiometer 198, the dial calibration is nearly logarithmic so that all points on the scale can be set with approximately equal resolution. With the device that has actually been tested, variation of the dial 44 over its full range varies the current out of the integrator over about 7 octaves.

Since the capacitor 190 is charged from the same source as is used to control the discharge rate of the capacitor 192, the current flow out of the integrator varies with supply voltage in the same proportion as the amount of charge transfer from the capacitor 190. Thus, the flow rate control will be relatively independent from the supply voltage over the normal operating range.

LOW FLUID LEVEL DETECTOR

The low fluid level detector circuit 148 includes the transistor 293 and bias resistors 295 and 297. The lower terminal of resistor 295 is connected to the negative 6 volt line 134 through the terminal 132, the conductive fluid in the bottle making contact with the exposed tip 82 (see FIG. 8) of the probe 30. This bias network maintains the transistor 293 in the "on" condition and permits operation of the rate control circuit 152 in the manner described above.

When the fluid level in the bottle drops below the tip 82 of the probe 30, an open circuit occurs between terminals 132 and 134 with the result that the resistor 293 turns off. The charge or current drawn from the integrator circuit then drops to a constant value corresponding to about 4 millileters per hour of fluid flow, the lowest level available in the device. This low flow rate persists until the bottle is empty, at which time separate provision is made to shut off the flow completely to prevent air infusion into the patient's veins. The time during which the low flow rate is in effect gives the attendant adequate time to replenish the fluid without shuting it off completely. The turn-off of transistor 293 actuates the low fluid level alarm circuit 158 to light the lamp 32 (in this case an LED) to signal the operator to replenish the fluid supply.

HIGH FLOW RATE DETECTOR

The high flow rate detector 156 is constructed so as to energized the high flow alarm circuit 162 only if the drop formation rate is higher than the desired value by a pre-determined amount. Specifically, the circuit is made insensitive to drop formation rates which are in excess of the desired rate by less than three or four drops. The reason for this is that in normal operation a few extra drops will be formed every now and then, as will drops be missed for various temporary reasons. It is desired not to signal in attendant except when it is absolutely necessary for the attendant to be present.

The high flow detector includes a transistor 254 whose emitter lead is connected to the output terminal $e_2$ of the integrator circuit 150 through a diode 262. Connected between the negative 6 volt line 134 and the base of transistor 254 if the parallel combination of a capacitor 256 and a resistor 258. Also connected to the base of transistor 254 is a resistor 260 which is connected to the collector of transistor 178 in the drop sense amplifier 146.

Excessively high flow rates can be caused by a number of abnormalities. One such abnormality is where the valve is continuously leaking. Another possible abnormality is where there is substantially continuous flow through the system because of the valve being stuck in the open position.

The excessive signals created by a few extra drops are accumulated on the capacitor 192 of the integrator. With each excessive drop, the level of the voltage $e_2$ drops lower. When $e_2$ drops to negative 6.8 volts, which corresponds to a net of three drops received above the desired rate, the base-emitter junction of transistor 154 becomes forward-bised through diode 262 so that the transistor 254 turns on. This delivers a signal to the high flow alarm 162 which then lights a red LED 40 to indicate to an attendant that attention is required to correct the condition.

If the abnormality is one in which there is continuous flow instead of excessive drops, the drop sense amplifier 146 will be turned on continuously. Thus, a voltage will be applied through the resistor 260 to the resistor 258 and capacitor 256 connected to the base of transistor 254. Resistor 258 and capacitor 256 together form an integrating filter for drop indications. Under normal circumstances, a drop pulse lasts only about 50 milliseconds, and there is a minimum of about 500 milliseconds between successive drops (500 milliseconds is the figure for the maximum flow rate of around 35 milliliters per hour). Under normal circumstances, capacitor 256 will not charge enough during the brief drop pulses to turn on transistors 254. However, when flow is continuous instead of in drops, capacitory 256 will be charged to a sufficient voltage to bias the base of transistor 254 and turn it on, thus energizing the high flow alarm circuit 162 so that an attendant can correct the situation.

LOW FLOW DETECTOR AND ALARM

It has been explained above how the control circuitry of the invention automatically deenergizes the valve drive coil 70 to allow the valve to close automatically when a drop detection signal has not been developed within 250 milliseconds after the valve has been opened. However, it is not desired to indicate trouble to an attendant when only one or an isolated few of such situations occur. A few drops can be missed because a patient rolls over or coughs or for other temporary reasons which do not need the attention of an attendant. A second problem is how to automatically reset the control system so it will be able to properly operate when the next drop actually is received.

The system for reseting the control system will be discussed first. When transistor 228 turns off, there is a sharp drop in the voltage at its collector. This is taken as a missed drop signal which is supplied to a capacitor 274 in the low flow detector circuit 154. Receipt of this signal causes capacitor 274 to transfer its charge through a diode 276 to the integrator, thus resetting the integrator in the same way that a drop indicating signal would through capacitor 190, except that capacitor 274, being twice as large as capacitor 190, drives the integrator twice as far.

When the integrator thus is reset, transistors 208, 222 and 232 turn off. Both ends of the valve coil 70 are then returned to zero through resistor 240. The valve control circuit 166 then is returned to its normally off state. As the missed drop signal rises on the positive terminal of capacitor 274, a diode 276 clamps the negative end of that capacitor and recharges it through a capacitor 266. Capacitor 266 is around 15 times greater than capacitor 274, so that each time a missed drop occurs, capacitor 266 receives a charge from capacitor 274, which causes a 0.4 volt step change in the voltage of capacitor 266. The voltage on capacitor 266, however, causes a current to flow back into the integrator through a resistor 270.

The reset charge which is delivered to the integrator by capacitor 274 when a drop is missed is taken from capacitor 266 and is returned by the integrator through resistor 270 over a relatively long period of time. In this manner, the sum of the charges at the integrator output and the average flow rate will be maintained at the set level in spite of occasional missed drops. For example, if one drop is missed, a quantum of charge is borrowed from capacitor 266 to reset the integrator. Capacitor 266 later will take repayment of the charge via resistor 270. This adds to the current out of the integrator and causes a slight increase in the frequency of drop requests. The increase decreases exponentially and will be zero after a while when the "loan" has been repaid. The slight increase in flow rate will, over the period of repayment, exactly compensate for the missed drop and the long term average flow rate will be maintained at the set rate.

Capacitor 266 also is used as a storage element in the proper actuation of the low-flow alarm circuit 160 only after a pre-determined number of drops have been missed. Capacitor 266 acts as a missed drop accumulator, since a series of missed drops will cause a series of cumulative step changes in the voltage on it. If the missed drop steps accumulate on capacitor 266 faster than the charge is returned via resistor 270, the voltage on capacitor 266 will rise. At a level corresponding to about four accumulated missed drops, the voltage becomes great enough to turn on a transistor 264, which sends a signal to the low-flow alarm circuit 160, which energizes a LED 38 (preferable red) to summon an attendant to correct the situation.

BLOCKED FLOW LIMIT TIMER

A transistor 278, with its associated timing network of resistors 280 anad 282 and a capacitor 284, form a blocked flow limit timer circuit.

If the parenteral fluid does not flow at a certain minimum flow rate, there will not be enough fluid to irrigate the vein, and clots may form in the needle. The blocked flow limit timer is provided to prevent such an occurrence by setting a limit on the maximum time between drops of fluid. This limit is arbitrarily set at 2.5 minutes. Transistor 278 normally is turned on. Each drop indication causes capacitor 284 to be charged to −5.4 volts through a diode 290. Following each drop indication, capacitor 284 will slowly discharge toward zero through resistors 280 and 282. The discharge rate is set such that if another drop indication is not received within 2.5 minutes, capacitor 284 will discharge to the point where transistor 278 loses its base drive signal and turns off. This allows the voltage across a bias divider circuit consisting of resistors 286, 267 and 268 to fall towards minus 6 volts. Transistor 264, in the low-flow detector circuit, will then be turned on through its emitter lead, thus enabling the low-flow alarm circuit 160.

As explained previously, when the fluid level in the container falls below the alarm level the wiper of the rate control potentiometer is open-circuited by transistor 293 in the fluid level sense amplifier 148. This causes the flow rate to be fixed at about four milliliters per hour. The current to establish this rate is provided through transistor 278 and resistor 286 at the CCW end of the potentiometer 198. If flow continues at the same rate until the bottle is depleted, fluid will cease to drop from the container, but will continue to flow from the drip chamber 20 each time the valve is opened. If the drop requests are not stopped shortly thereafter, the fluid in the drip chamber and the lines 22 and 26 will be completely depleted and air will be infused into the patient's veins.

When the fluid in the bottle 14 is completely depleted, the drop indications will cease. Within 2.5 minutes, transistor 278 will turn off and all current to the integrator will cease. Since the integrator cannot charge, it cannot turn on the valve control circuit 166. Therefore, all fluid flow will stop well before the fluid reservoir in the drip chamber 20 is depleted, and air will not be infused. The unit will remain off with both the low-level and low-flow alarms lights flashing until the fluid supply is replenished by the attendant. The unit will automatically resume operation only when the conditions for normal operation are met.

ALARM CIRCUITS

The three alarm circuits 158, 160 and 162 are virtually identical. In each alarm circuit, a relaxation oscillator responds to current supplied by the corresponding detector, and soon starts pulsing its associated light-emitting diode with a relatively high current (80 ma) for about 40 milliseconds once every 2 seconds. This provides a series of brilliant red flashes on the front panel of the unit 24 to indicate the source of trouble. However, the alarm circuit creates an average battery current drain of only 1.6 ma to create such highly visible signals. The standby current required for the alarm circuit is zero.

Since the alarm circuits are the same, only the low level circuit 158 will be explained. Two transistors 294 and 296 are connected in a positive feedback configuration. When transistor 293 in the fluid level sense amplifier 148 turns off, current is allowed to flow through a resistor 306, and a capacitor 298 will start to charge negatively. When the positive end of capacitor 298 reaches about −1.0 volts, the base of transistor 294 will conduct obtaining current through the base emitter path of a transistor 310 in the remote alarm circuit 164. The collector of 294 then will conduct, turning on transistor 296 through a resistor 308. The collector of transistor 296 then will fall to −6 volts, driving the LED 32, a resistor 304 and a diode 200. The resulting negative voltage drop across a resistor 302 is coupled back to the base of transistor 294 through capacitor 298, thus driving transistor 294 into saturationn very hard. The LED 32 in series with resistor 302 forms a voltage divider circuit which establishes the anode voltage of diode 300 at −4.0 volts. Capacitor 298 will continue to charge through resistor 304 and the base-emitter path of transistor 294. The charging current for the capacitor is sufficient to hold transistor 294 in hard saturation. When the negative end of capacitor 298 reaches −4.6 volts, diode 300 will be forward-biased and the current through resistor 304 will be diverted through diode 300, thus ceasing to flow through capacitor 298 and the base-emitter path of transistor 294. The small current through resistor 306 is not sufficient to hold transistor 294 in hard saturation, so that transistor 294 will begin to recede from saturation. The decrease in base drive signal to transistor 296 will cause a slight rise in its collector voltage. This slight rise is coupled through the LED 32 and diode 300, and thence through capacitor 298 to the base of transistor 294 where it causes a further decrease in the base drive signal. Both transistors 294 and 296 will rapidly turn off. Capacitor 298 couples a positive 4 volt step voltage to the base of transistor 294, holding that transistor off. Capacitor 298 then recharges through resistor 306, with about 2 seconds elapsing until the turn-on level of resistor 294 is again reached, thus producing another 40 millisecond pulse.

Transistors 294 in each of the alarm circuits are connected together and draw current through the base-emitter path of transistor 310 in the remote alarm circuit 164. If any one of the alarms operates, transistor 310 is turned on for 40 milliseconds. This energizes a relay 314 and closes its single conductively isolated contact 316. The closing of the contact 316 completes a circuit over signal lines 318 to a remote nursing station terminal 320, thus signaling the nurse to attend to the patient.

The above description of the invention is intended to be illustrative and not limiting. Various changes or modifications in the embodiments described may occur to those skilled in the art and these can be made without departing from the spirit or scope of the invention.

We claim:

1. A parenteral fluid flow controller comprising, in combination, closed conduit means for conveying said fluid to a patient, flow control valve means including a magnetic check valve enclosed within said conduit for controlling the flow of said fluid to said patient, actuating means including magnetic means outside of said conduit for repeatedly actuating said valve means to permit flow therethrough in increments, drop formation means for forming drops of said fluid from a fluid reservoir, and control means for making the time duration of opening of said valve means inversely proportional to the time rate of formation of said drops at substantially all times during the operation of said controller.

2. A controller as in claim 1 including means for making the frequency of actuation of said valve means substantially greater than the drop formation frequency.

3. A controller as in claim 1 including time delay means for disabling said actuating means in response to a pre-determined time delay in the formation of a drop, said delay being at least equal to the time required to form a plurality of drops at a pre-determined frequency.

4. A controller as in claim 1 including means for comparing the drop formation frequency with a pre-determined frequency and developing an alarm signal in response to the detection of a drop formation frequency which is different from said pre-determined frequency by more than a pre-determined amount.

5. A controller as in claim 1 including means for detecting the reservoir level of said fluid and producing an alarm signal in response to the detection of a level below a pre-determined value, and means for reducing the duration of opening of said valve to a fixed minimum level in response to said alarm signal, and for closing said valve indefinitely when no drop has been formed for a pre-determined length of time.

6. A parenteral fluid flow controller as in claim 1 in which said magnetic check valve includes a housing, a valve seat in said housing, a movable valve member in said housing, said valve member having a portion of magnetic material, a barrier member positioned adjacent said seat and said valve member to limit the lateral travel of said valve member away from said seat and maintain said valve member in a position, at its point of laterally furthest travel, in which the flow of fluid through said valve urges said valve member towards said seat, and magnetic force-creating means for creating a lateral magnetic force for moving said valve member towards said barrier member and away from said seat to open said valve.

7. A controller as in claim 1 in which said magnetic check valve includes a valve member with at least a portion made of magnetic material, said magnetic means outside of said conduit including tipping means for tipping and thereby unseating said valve member by means of a magnetic field.

8. A controller as in claim 7 in which said check valve includes a valve seat in said conduit, said valve member having a transverse closure portion and an axiallyextending stem of magnetic material, said tipping means including a magnet positioned adjacent said stem outside said conveying means.

9. A controller as in claim 1 in which said actuating means includes an oscillator, and means for setting the frequency of said oscillator to correspond to changes in the size of said drops.

10. A controller as in claim 1 including irrigation means for automatically opening and closing said valve means when no drop has been detected for a pre-determined length of time to maintain a minimum level of fluid flow.

11. A controller as in claim 10 including means for disabling said irrigation means in response to the absence of a drop detection for a further pre-determined length of time.

12. A controller as in claim 1 including drop detection means for forming a drop signal corresponding to each of said drops, signal generating means for generating a rate signal whose magnitude varies with respect to time at a predetermined rate, level detector means for detecting the magnitude of said rate signal and actuating said valve means when said magnitude crosses a pre-determined level, and starting means responsive to said drop signal for restoring said rate signal to a starting level.

13. A controller as in claim 12 including means to vary said rate in order to vary the rate of fluid flow through said conduit.

14. A controller as in claim 12 in which said starting means is adapted to restore said rate signal by a fixed amount.

15. A parenteral fluid flow controller comprising means for forming drops of said fluid, a conduit means for conducting fluid from said drop forming means to a patient, drop detecting means for detecting said drops, valve means for regulating the flow through said conduit means, means for opening said valve means, means for automatically closing said valve means when the time between successive drop detections exceeds a pre-determined value, means for developing a signal whenever the automatic closing means operates, means for accumulating said signals over a length of time, and means for gradually introducing said signals into the controller system so as to compensate for the flow lost and maintain an even flow rate.

16. In a parenteral fluid administration device, means for forming drops of fluid, means for conducting fluid from said drop forming means to a patient, drop detector means for developing an electrical signal in response to detection of a drop, said drop detector means having first electrode means for contacting said fluid upstream from the position at which said drop is formed, and second electrode means positioned at a distance below said drop formation position such that a drop forming at said position will contact said second electrode only after it has started to decrease in diameter at its base to separate from said upstream fluid, but before said drop is completely separated from said upstream fluid.

* * * * *